Figure 1:
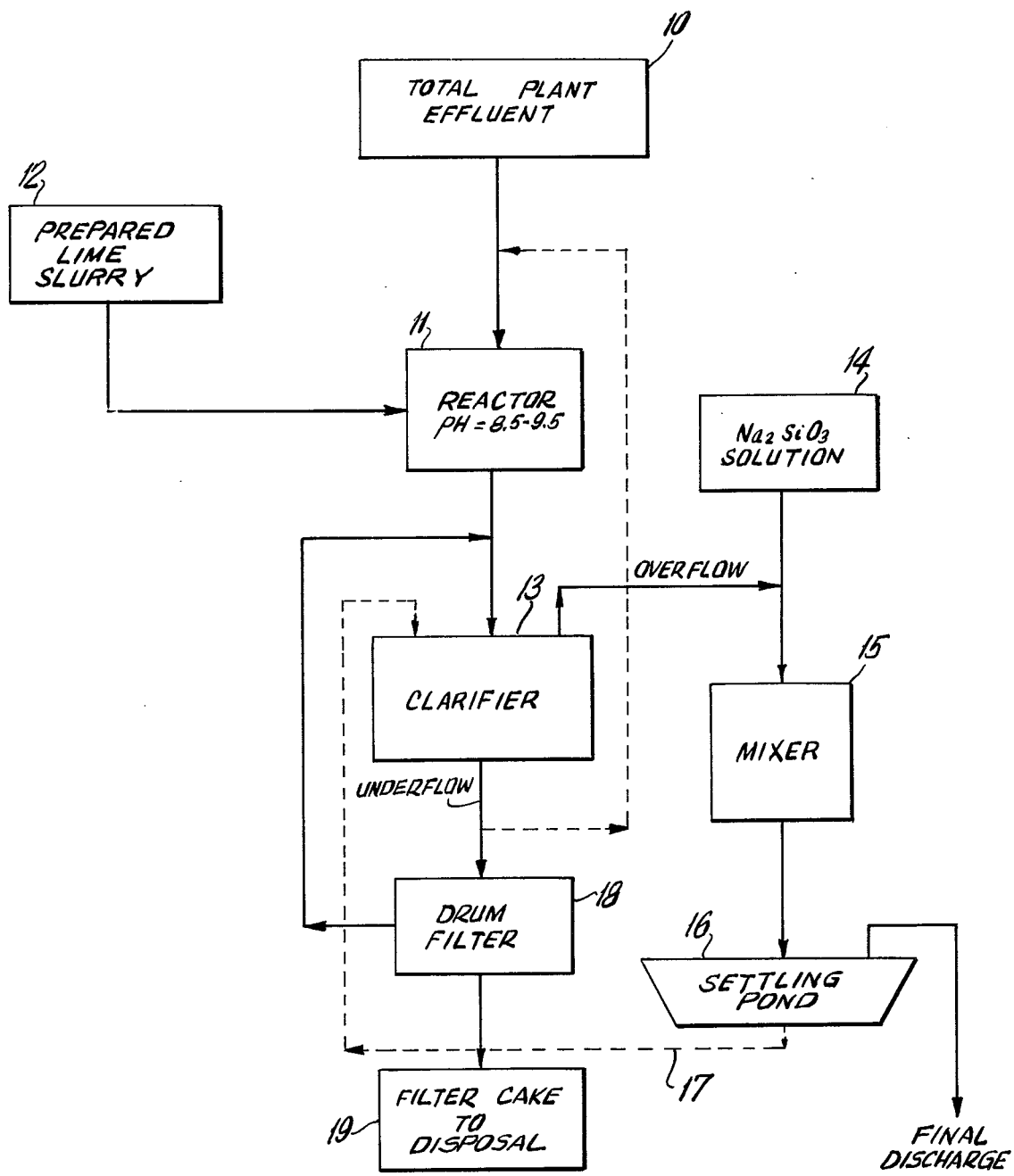

United States Patent [19]

Pagel

[11] 4,025,430
[45] May 24, 1977

[54] REMOVAL OF METAL IONS FROM WASTE WATER

[75] Inventor: Richard F. Pagel, Belleville, Ill.

[73] Assignee: Amax Inc., New York, N.Y.

[22] Filed: Jan. 12, 1976

[21] Appl. No.: 648,289

[52] U.S. Cl. .............................................. 210/53
[51] Int. Cl.² ...................................... C02C 5/02
[58] Field of Search ............... 210/42, 45, 47–49, 210/50–53, 61, 60

[56] References Cited

UNITED STATES PATENTS

| | | | |
|---|---|---|---|
| 2,217,466 | 10/1940 | Baylis .................................. | 210/52 |
| 3,575,853 | 4/1971 | Gaughan et al. ..................... | 210/50 |
| 3,575,854 | 4/1971 | Richards .............................. | 210/50 |
| 3,755,158 | 8/1973 | Inazuka et al. ...................... | 210/50 |
| 3,800,024 | 3/1974 | Forsell et al. ....................... | 210/42 |

OTHER PUBLICATIONS

Water Treatment Handbook; Degremont (1973), pp. 507–509.

Babbitt et al.; "Sewerage and Sewage Treatment," N.Y., J. Wiley & Sons Inc., (1958), pp. 446–449.

*Primary Examiner*—Frank A. Spear, Jr.
*Assistant Examiner*—Benoit Castel
*Attorney, Agent, or Firm*—Kasper T. Serijan; Eugene J. Kalil

[57] ABSTRACT

A method is provided for treating industrial waste water, such as aqueous effluents obtained in the hydrometallurgy of zinc to remove metal ion impurities therefrom, the method comprising, neutralizing the waste water with slaked lime to provide a final pH of at least 8.5 to precipitate hydroxides of metals which form precipitatable hydroxides at said pH and provide an aqueous effluent containing residual quantities of metal ions such as cadmium and manganese, capable of being removed from solution by the addition of a soluble silicate solution, separating the aqueous effluent from the hydroxide precipitate, adding to the effluent a soluble silicate solution in an amount at least sufficient to remove the residual metal ions from solution, and then separating the treated effluent from said precipitate.

2 Claims, 2 Drawing Figures

REMOVAL OF METAL IONS FROM WASTE WATER

This invention relates to the removal of metal contaminants from industrial waste water as a source of pollution and, in particular, to the removal of metal contaminants from aqueous effluents obtained in the hydrometallurgy of zinc ores.

STATE OF THE ART

Aqueous effluents obtained as a waste product in the hydrometallurgy of zinc ores present the problem of pollution due to the presence of metal contaminants. Generally, such effluents contain Zn, Cd, Pb, Mn, Fe, Ni, As, Hg, Mg, Ca and other contaminants which adversely affect environmental waters, such as lakes, rivers, underground waters and the like. Due to the recent restrictions placed on the disposal of such effluents by the Environmental Protective Agency (EPA), a compelling need has developed for processes to treat such effluents in order to avoid evnironmental pollution.

It is known to remove base metals from certain acidic waste waters by raising the pH of the water to over 9 to precipitate such metal ions as Ni, Fe, Mn, Zn, and other metals. However, such method do not provide a complete removal of certain ions to EPA standards, such as Hg, Cd, Mn and the like.

Zinc process solutions usually contain a fairly large number of metal ions which present the foregoing problem. The important elements of interest are Zn, Cd, Pb, Hg and Mn as these elements, particularly Cd, Hg and Pb, tend to be toxic.

It would be desirable to treat solutions of the foregoing type in an economical manner to remove efficiently at least the elements of interest referred to hereinabove.

OBJECT OF THE INVENTION

It is an object of the invention to provide a method for treating waste water containing metal contaminants.

Another object is to provide a method for treating aqueous effluents resulting from the hydrometallurgy of zinc.

Figure 2:
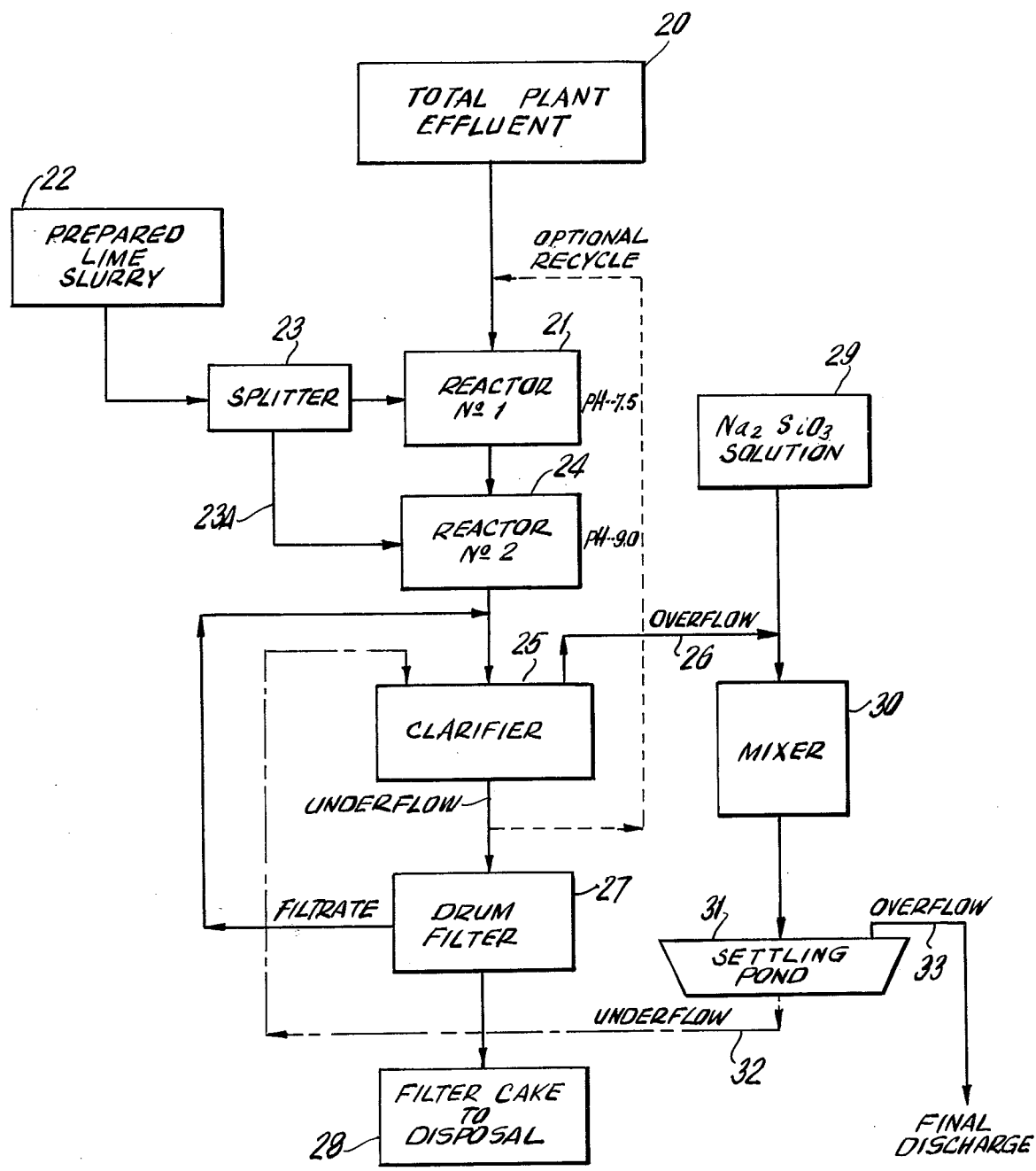

These and other objects will more clearly appear when taken in conjunction with the following disclosure and the accompanying drawing, wherein:

FIGS. 1 and 2 are flow sheets illustrating two embodiments of the invention.

STATEMENT OF INVENTION

Broadly stated, the invention is directed to a method for removing metal ion impurities from industrial waste water comprising the sequential steps of neutralizing the waste water with slaked lime to a final pH of at least about 8.5 to precipitate hydroxides of metals which form precipitable hydroxides at said pH and provide an aqueous effluent containing residual quantities of metal ions other than Mg, Ca, Na and K, capable of being removed from the solution by the addition of a soluble silicate solution, separating said effluent from the hydroxide precipitate, adding to said effluent a soluble silicate solution in an amount at least sufficient to remove said residual metal ions from the solution, and then separating the silicate-treated effluent from said precipitate.

The foregoing method is particularly applicable to the treatment of aqueous effluents obtained in the hydrometallurgy of zinc. Such solutions are usually at ambient temperature but may range in temperature up to about 70° C and generally contain at least 20 ppm total of the elements Zn, Cd, Pb, Mn and Fe, each of these elements being present in amounts of at least 2 ppm, the solutions also containing at least one of the elements Ni, As, Cu, Cr, Hg, Mg, Ca, among others, at least one element being present in amounts of over 1 ppm. The foregoing solutions may contain up to about 25,000 ppm of contaminanting metal ions. The pH of these solutions is usually less than 4 or 3.

The embodiment for carrying out the invention is illustrated in the flow sheet of FIG. 1 for treating total plant effluent. The total plant effluent is a composite of all waste effluents in the plant which may contain Zn, Cd, Pb, Fe, Mg, Ca, Mn, Hg, Na(K), Cu, Ni, Cr, As, $Cl^-$, $F^-$, $SO_4^=$, etc. The magnesium and calcium are not removed with the treatment of the invention but remain with the final effluent for further treatment, if necessary, depending upon the magnesium and calcium content. This treatment is conventional and need not be described here, the method of the invention being directed to the removal of Zn, Cd, Pb, Fe, Mn, Hg, among other elements.

Thus, referring to FIG. 1, total plant effluent 10 is fed to reactor 11 to which a lime slurry 12 is added in an amount to provide a final pH of about 8.5 to 9.5 to produce metal hydroxides. The effluent with the hydroxide precipitate is discharged to clarifier 13 with the overflow containing residual elements, such as Zn, Cd, Mn, Hg, etc., going to the discharge line of sodium silicate ($Na_2SiO_3$) solution 14 and thence to mixer 15 where the residual elements other than Mg, Ca, Na and K, are precipitated, the solution and precipitate going to settling pond 16. The settled precipitate may be recycled periodically to clarifier 13 via line 17 to join the hydroxide precipitate in the clarifier which goes to drum filter 18, the filtrate from the filter being recycled to the line feeding the clarifier. A filter cake 19 is formed of the precipitates which is then disposed of.

The flow sheet of FIG. 2 is a preferred embodiment and is described as follows:

The total plant effluent 20 is preferably passed to a first reactor 21 (No. 1) to which a lime slurry is added. The lime slurry 22 is prepared at 22 and an aliquot portion fed to the reactor 21 in a first stage treatment via a splitter 23, the aliquot portion ranging from about 50% to 95% of the total lime slurry to be used, the amount added being sufficient to provide a pH of about 7 to 8 (7.5 preferred) to precipitate some of the metal ions present as hydroxides. The lime-effluent mixture in a second stage treatment is passed to the second reactor 24 (No. 2) to which the remainder of the lime slurry is added via line 23 A from splitter 23 to raise the pH to about 8.5 to 9.5 (preferably about 9) to substantially complete the precipitation of the metal hydroxides.

The amount of lime added generally ranges from about 5% to 20% excess of stoichiometric requirements, e.g., 8% to 15% of excess. The lime slurry may contain about 5% to 20% by weight of CaO.

The reacted mixture is sent to clarifier 25 to provide a thickened underflow of metal hydroxide precipitate and an overflow 26 of aqueous effluent containing residual metal ions than Ca, Mg, Na and K capable of being precipitated by sodium silicate. The underflow is filtered at drum filter 27 to form a filter cake 28 which goes to disposal. The filtrate from the filter is preferably recycled to clarifier 25. The overflow 26 from the clarifier is mixed with sodium silicate solution 29 at mixer 30, the amount of sodium silicate being at least sufficient to remove such residual metals as Zn, Cd, Mn, Ni, Hg, As, etc. The sodium silicate reacted effluent is sent to a settler, e.g., settling pond 31, the underflow 32 of which may be optionally recycled to clarifier 25, the overflow 33 going to further treatment, if necessary, for the Ca and Mg ions present. The amount of sodium silicate added may range from about 5 to 30 times stoichiometry. The residual metals treated with the sodium silicate solution include at least two metals from the group Zn, Cd, Mn, Ni, Hg and As, particularly Cd and Mn.

As stated hereinabove, the main metals of interest are Zn, Pb, Mn and Fe and these are substantially completely removed with the method of the invention by using the duplex treatment of first precipitating metal hydroxides using slaked lime followed by the use of sodium silicate solution to remove such residual elements as Zn, Cd, Mn, Ni, Hg and As.

As illustrative of the invention as applied to composite effluents obtained in the hydrometallurgy of zinc, the following examples is given:

EXAMPLE

About 400,000 U.S. gallons/day (USGPD) of plant effluent corresponding to 3,350,000 pounds by weight are treated in accordance with the invention on a daily basis. The amount of metal ions present in ppm or mg/liter is shown in the following head analysis of an effluent having a pH of 1.4:

TABLE 1

| Anions, Cations | PPM or mg/liter |
|---|---|
| Zn | 1456. |
| Cd | 20.4 |
| Pb | 48.5 |
| Fe | 507. |
| Mg | 3000. |
| Ca | 360. |
| Mn | 8. |
| Hg | 1.17 |
| Ni | 10.8 |
| As | 5.1 |
| F$^-$ | 50. |
| Total SO$_4^-$ | 25,000. |
| Free H$_2$SO$_4$ | 8,584. |

A lime slurry containing about 10% by weight of CaO is provided for treating the foregoing amount of effluent, the amount of lime being calculated to provide a 15% excess over stoichiometry required to treat the effluent. The effluent is treated continuously in Reactors No. 1 and No. 2 (FIG. 2). The contents of Reactor No. 1 (21) are treated with an aliquot portion of the lime slurry (e.g., 88%) and then passed on to Reactor No. 2 (24) and treated with the remainder aliquot portion (e.g., 12%) of the lime slurry.

The lime slurry flow 22 is divided, a portion of the slurry going into the Reactor No. 1 to provide a pH of 7.5, the remainder going into Reactor No. 2 to raise the pH to about 9. The foregoing step-wise application of the lime is preferred.

The lime-treated effluent (pH of about 9 to 9.2) leaves Reactor No. 2. It is fed into clarifier 25 and thickened to provide an underflow which is then passed on to drum filter 27. Clarified overflow 26 goes to sodium silicate treatment in mixer 30. A typical analysis of the effluent after the lime treatment is shown in Table 2 below. Part of the underflow from the clarifier may be optionally recycled to the effluent entering Reactor No. 1 to control the character of the precipitate formed.

The filtrate is recycled from the drum filter to clarifier 25. The filter cake is sent to disposal 28 as shown in the preferred flow sheet of FIG. 2.

Sodium silicate solution is mixed with the overflow from clarifier 25. A small amount of a flocculating agent, for example, a polyacrylamide solution, is added to coagulate the precipitate formed, the treated effluent going into the settling pond 31 where the silicate-forming precipitate is allowed to settle. Periodically, the settled precipitate or underflow is recycled from the settling pond to the clarifier for removal by drum filter 27.

The analysis of the finally treated effluent entering the settling pond is shown in Table 2 in parts per million (ppm) as follows:

TABLE 2

| Anions Cations | After Lime Treatment | After NaSiO$_3$ Treatment | Standard EPA (max) |
|---|---|---|---|
| Zn | 0.8 | 0.23 | 1.0 |
| Cd | 1.2 | 0.04 | 0.15 |
| Pb | 0.01 | 0.01 | 0.1 |
| Fe | 0.1 | 0.07 | 0.5 |
| Mg | 2460. | 2232. | — |
| Ca | 530. | 530. | — |
| Mn | 3. | 0.35 | 1.0 |
| Hg | 0.02 | 0.0004 | 0.0005 |
| Ni | <0.02 | 0.01 | 1.0 |
| As | 0.09 | 0.06 | 0.25 |
| F$^-$ | 23. | 11.6 | 2.5 |
| Total SO$_4^-$ | 10,000. | — | — |
| Suspended Solids | <15. | — | 15. |

As will be noted, substantially all of the heavy metal elements of interest (Zn, Cd, Pb, Fe, Mn, Hg, Ni and As) meet the EPA standards.

The sodium silicate solution employed is preferably prepared from a strong sodium silicate solution. The solution concentration may range from about 10% to 30% by weight of sodium silicate, the amount employed corresponding to about 5 to 30 times that required stoichiomentrically.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of treating an acid aqueous effluent of pH less than 4 obtained in the hydrometallurgy of zinc for removing metal ion impurities therefrom comprising the sequential steps of:

passing said aqueous effluent containing at least 20 ppm total of the metal ions Zn, Cd, Pb, Mn and Fe, each of said metal ions being present in amounts of at least about 2 ppm, said effluent also containing at least 1 ppm of the metal ions Mg, Ca, Hg, Na, K, Cu, Ni, Cr and As to a first reactor, preparing an amount of a lime slurry sufficient to neutralize said aqueous effluent and mixing an aliquot portion thereof comprising about 50% to 95% of said lime slurry with said aqueous effluent in a first stage treatment in said first reactor sufficient to raise the pH thereof to about 7 to 8 and precipitate metal hydroxides therein.

then in a second stage treatment passing said limewater-precipitate mixture to a second reactor to which the remainder of said lime slurry is added to provide a higher pH of about 8.5 to 9.5 effective to complete the precipitation of said metal hydroxides and provide an aqueous effluent containing residual metal ions other than Ca, Mg, Na and K ions selected from the group consisting of at least two elements of the group Zn, Cd, Mn, Hg and As, the total amount of lime (CaO) added ranging from about 5% to 20% excess of that required stoichiometrically to precipitate said hydroxides.

passing said reacted mixture to a clarifier to provide a thickened underflow of said metal hydroxide precipitate and an overflow of said aqueous effluent, filtering said underflow of thickened precipitate to form a filter cake and recycling the filtrate thereof to said clarifier, treating said overflow of aqueous effluent with an amount of sodium silicate solution corresponding to about 5 to 30 times that amount required stoichiometrically to remove said residual metal ions from solution as a precipitate, adding a flocculating agent to agglomerate the precipitate formed, disposing of said filter cake, and passing said sodium silicate treated effluent to a settler, the overflow of said settler being discharged substantially free of said residual metal ion impurities.

2. The method of claim 1, wherein the amount of metal ions present range up to about 25,000 ppm.

* * * * *